(12) United States Patent
Higashi

(10) Patent No.: US 10,719,000 B2
(45) Date of Patent: Jul. 21, 2020

(54) DISPLAY DEVICE AND METHOD FOR CONTROLLING DISPLAY DEVICE

(71) Applicant: SEIKO EPSON CORPORATION, Tokyo (JP)

(72) Inventor: Keisuke Higashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/364,736

(22) Filed: Mar. 26, 2019

(65) Prior Publication Data
US 2019/0302594 A1 Oct. 3, 2019

(30) Foreign Application Priority Data
Mar. 27, 2018 (JP) .................. 2018-059463

(51) Int. Cl.
*G03B 21/20* (2006.01)
*G06F 3/0484* (2013.01)
*H04N 5/225* (2006.01)

(52) U.S. Cl.
CPC ..... *G03B 21/2006* (2013.01); *G03B 21/2066* (2013.01); *G06F 3/04845* (2013.01); *H04N 5/2253* (2013.01)

(58) Field of Classification Search
CPC .... G03B 21/006; G03B 21/28; G03B 21/147; G03B 21/206; G03B 21/2006; G03B 21/2066; H04N 9/3129; H04N 9/3185; H04N 9/3194
See application file for complete search history.

(56) References Cited

U.S. PATENT DOCUMENTS

| 2005/0270494 A1* | 12/2005 | Banning ................. G06F 3/012 353/42 |
| 2011/0007283 A1* | 1/2011 | Tanaka ................. H04N 9/3185 353/70 |
| 2012/0105816 A1* | 5/2012 | Ozawa ................. G03B 21/006 353/85 |
| 2015/0168818 A1* | 6/2015 | Nishimura ........... G03B 21/142 353/28 |
| 2017/0329459 A1* | 11/2017 | Ishihara ............... G03B 21/008 |
| 2018/0088688 A1* | 3/2018 | Otani .................... H04N 9/3179 |

FOREIGN PATENT DOCUMENTS

JP 2017-009829 A 1/2017

\* cited by examiner

*Primary Examiner* — Sultan Chowdhury
(74) *Attorney, Agent, or Firm* — Oliff PLC

(57) ABSTRACT

A projector includes: a projection unit; a detection light irradiation unit which radiates detection light onto a detection area which is set corresponding to a display area of the projection unit; an image pickup unit which receives reflected light of irradiation detection light reflected in the detection area; and a control unit which carries out detection of an operation of a non-light-emitting pointing element and detection of an obstacle blocking the detection light, and causes the projection unit to display information about the obstacle.

16 Claims, 9 Drawing Sheets

DISPLAY DEVICE AND METHOD FOR CONTROLLING DISPLAY DEVICE

BACKGROUND

1. Technical Field

The present invention relates to a display device and a method for controlling a display device.

2. Related Art

According to the related art, a device which detects a position designated by a user's operation, using light, is known (see, for example, JP-A-2017-9829). The image projection device disclosed in JP-A-2017-9829 detects a pointed position of an electronic pen and thus realizes an interactive operation. Also, if an obstacle is detected, the image projection device of JP-A-2017-9829 carries out a setting to eliminate an area affected by the obstacle from an area where the operation is enabled.

With the related-art configuration, the user may not be able to recognize that the operation can no longer be carried out since the obstacle is detected.

SUMMARY

An advantage of some aspects of the invention is that a device which detects an operation, using light, provides the user with information about the influence of an obstacle when the detection of the operation is affected by the obstacle.

A display device according to an aspect of the invention includes: a display unit which displays an image; a light radiation unit which radiates detection light onto a detection area which is set corresponding to a display area where the display unit displays the image; a light receiving unit which receives reflected light of the detection light reflected in the detection area; and a control unit which carries out detection of an operation of a pointing element in the detection area and detection of an obstacle blocking the detection light, based on a light reception state of the light receiving unit, and causes the display unit to display information about the obstacle.

In the aspect of the invention, the information about the obstacle is displayed. Thus, a user carrying out the operation can be provided with the information about the obstacle hindering the detection of the operation.

The aspect of the invention may be configured such that the control unit causes the display unit to display a position of the obstacle in the display area.

This configuration can provide the user with the information about the position of the obstacle.

The aspect of the invention may be configured such that the control unit specifies a detection-hindered area where irradiation with the detection light is hindered by the obstacle in the detection area, and causes the display unit to display the detection-hindered area.

This configuration can provide the user with the information about the area where the detection of the operation is hindered.

The aspect of the invention may be configured such that the control unit causes the display unit to display an image showing the detection-hindered area and an image showing a position of the obstacle in the detection area.

This configuration can provide the user with the information about the position of the obstacle and the area where the detection of the operation is hindered.

The aspect of the invention may be configured such that the control unit causes the display unit to display a setting request which requests a setting about whether to disable detection of an operation of the pointing element in the detection-hindered area or not.

This configuration can prompt the user to set whether to disable the detection of the operation or not.

The aspect of the invention may be configured such that the display device further includes an operation unit which accepts an operation, and the control unit sets processing to detect an operation in the detection area according to an operation accepted by the operation unit in response to the setting request.

This configuration enables the user to carry out a setting about the detection of the operation.

The aspect of the invention may be configured such that the light receiving unit is an image pickup unit which picks up an image over a range including the detection area, and the control unit detects an image of the reflected light from a picked-up image picked up by the image pickup unit to carry out detection of an operation of the pointing element in the detection area and detection of an obstacle blocking the detection light.

This configuration, where the reflected light of the detection light is detected from the picked-up image so as to detect the operation by the user, can provide the user with the information about the obstacle.

The aspect of the invention may be configured such that the control unit estimates a position and size of the obstacle, based on a centroid of the image of the reflected light detected from the picked-up image picked up by the image pickup unit and a size of the image of the reflected light, and causes the display unit to display an image based on the estimated position and size of the obstacle.

This configuration can provide the user with the information about the position and size of the obstacle, based on the image of the reflected light in the picked-up image.

A method for controlling a display device according to an aspect of the invention includes: causing a display device displaying an image to radiate detection light onto a detection area which is set corresponding to a display area where an image is displayed; causing the display device to receive reflected light of the detection light reflected in the detection area; causing the display device to carry out detection of an operation of a pointing element in the detection area and detection of an obstacle blocking the detection light, based on a light reception state of the reflected light; and causing the display device to display information about the obstacle.

In this configuration, the information about the obstacle is displayed. Thus, a user carrying out an operation can be provided with information about an obstacle hindering the detection of the operation.

The invention can also be implemented in various other forms than the display device and the method for controlling the display device. For example, the invention may be implemented as a program executed by a computer (or processor) to execute the method. The invention can also be implemented as a recording medium having the program recorded thereon, a server device which distributes the program, a transmission medium which transmits the program, a data signal which embodies the program in a carrier wave, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Outline of Projection System

Figure 1:
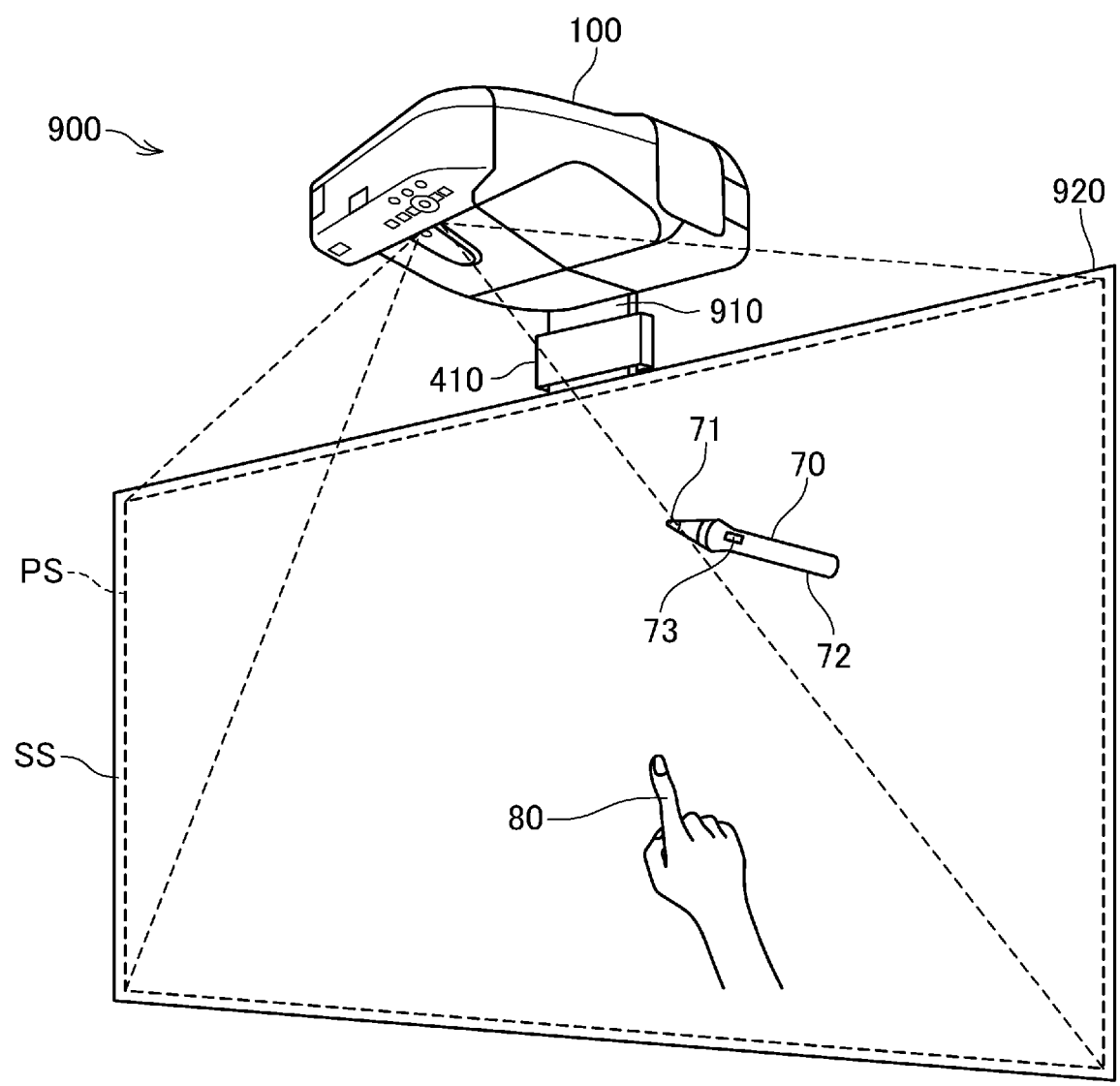
FIG. 1 shows a schematic configuration of a projection system.

FIG. 1 is a perspective view of a projection system 900 according to an embodiment of the invention. The projection system 900 has a projector 100 and a self-light-emitting pointing element 70. In the projection system 900, a non-light-emitting pointing element 80 can be used in combination with the projector 100.

In the projection system 900, a screen board 920 is arranged at a position corresponding to the projector 100. The front side of the screen board 920 is used as a screen SS. The projector 100 is fixed at a position forward and upward from the screen board 920 by a support member 910. While the screen SS is vertically arranged in FIG. 1, the projection system 900 can be used where the screen SS is horizontally arranged. The screen SS may also be a curtain hanging on a wall surface or may be a surface of a piece of furniture. Also, a wall surface or a floor surface may be used as the screen SS. In this embodiment, the screen SS refers to a surface of a member where an image is projected.

The projector 100 projects image light onto the screen SS and thus forms a projection screen PS as a projection image on the screen SS. The projection screen PS refers to the area of an image projected on the screen SS by the projector 100. In the normal use of the projector 100, the projection screen PS is projected to fit within the screen SS.

The operation of the projector 100 projecting the projection screen PS can be referred to as an operation of displaying an image on the screen SS. The projector 100 functions as a display device. The projection screen PS projected by the projector 100 can be referred to as a display image.

The projection screen PS is an image projected, for example, based on image data stored in the projector 100 or generated by the projector 100. The projector 100 is an example of a display device. The operation of the projector 100 projecting the projection screen PS is an example of an operation of a display device displaying an image. If there is no image drawn inside the projector 100, light is cast onto the projection screen PS from the projector 100 and a white image is thus displayed.

The projection system 900 functions as a display system in which the projector 100 projects the projection screen PS onto the screen SS. In the projection system 900, a position pointing operation can be carried out on the screen SS via the self-light-emitting pointing element 70 and the non-light-emitting pointing element 80. The projector 100 detects the pointed position pointed by the self-light-emitting pointing element 70 and the non-light-emitting pointing element 80.

The self-light-emitting pointing element 70 is a pen-type pointing element having a distal end part 71 which can emit light, a shaft part 72 held by the user, and a button switch 73 provided on the shaft part 72. The configuration and functions of the self-light-emitting pointing element 70 will be described later.

The number of self-emitting pointing elements 70 that can be used in the projection system 900 may be one or a plurality and is not particularly limited. The same applies to the non-light-emitting pointing element 80. The non-light-emitting pointing element 80 is a pen which does not emit light, a finger of the user, or the like. In the description below, when the self-light-emitting pointing element 70 and the non-light-emitting pointing element 80 are not discriminated from each other, the pointing element in use is referred to simply as a pointing element 780. The pointing element of the invention is equivalent to the non-light-emitting pointing element 80 and may include the self-light-emitting pointing element 70.

Configuration of Projection System

Figure 2:
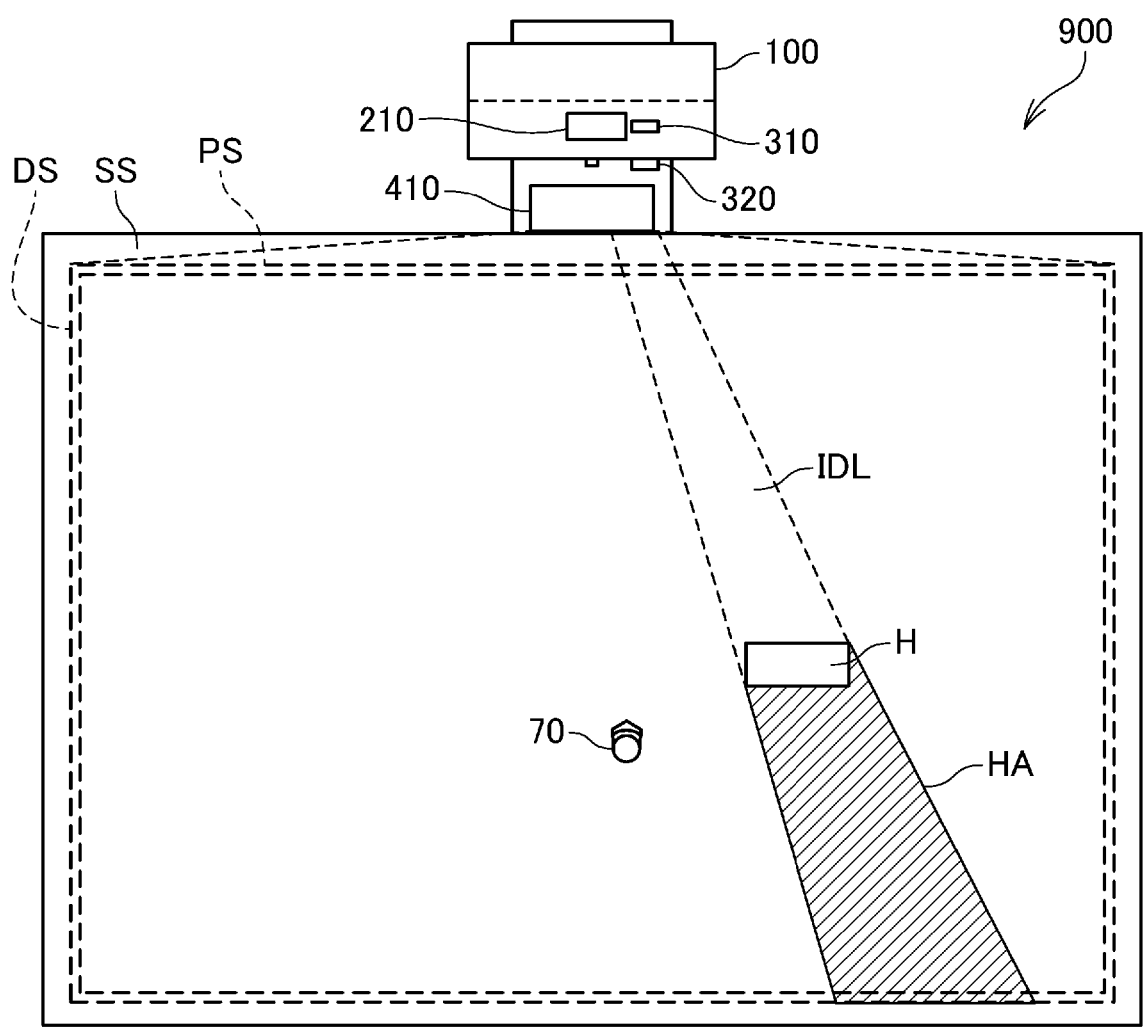
FIG. 2 is a front view of the projection system.
Figure 3:
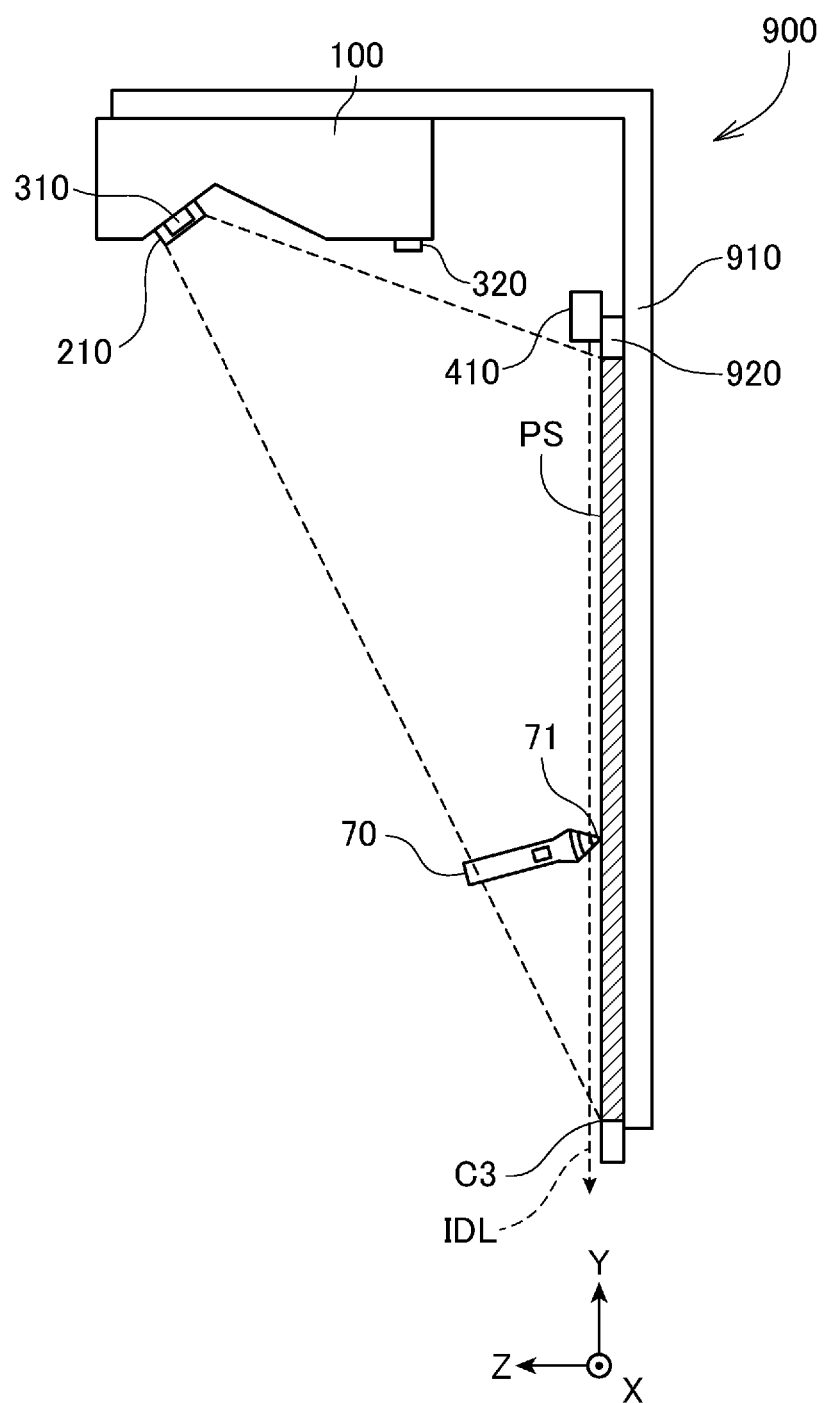
FIG. 3 is a side view of the projection system.

FIG. 2 is a front view of the projection system 900. FIG. 3 is a side view of the projection system 900. In the description below, a direction along the left-right side of the screen SS is defined as an X-direction. A direction along the up-down side of the screen SS is defined as a Y-direction. A direction along a normal line to the screen SS is defined as a Z-direction. For the sake of convenience, the X-direction is also referred to as a "left-right direction". The Y-direction is also referred to as an "up-down direction". The Z-direction is also referred to as a "front-rear direction". Of the Y-direction, the direction in which the projection screen PS is located as viewed from the projector 100 is referred to as a "downward direction".

The projector 100 has a projection lens 210 which projects the projection screen PS onto the screen SS, a first camera 310 and a second camera 320 which pick up an image over the area of the projection screen PS, and a detection light irradiation unit 410 (light radiation unit) which casts detection light on the pointing element 780.

The angle of view of the first camera 310 and the second camera 320, that is, the image pickup range, is a range including at least the projection screen PS on the screen SS.

The detection light irradiation unit 410 is fixed to the support member 910 or the screen board 920 and arranged at a top part of the screen SS.

The detection light irradiation unit 410 casts irradiation detection light IDL for detecting a distal end part of the pointing element 780, into a direction including the screen SS. Specifically, the detection light irradiation unit 410 casts the irradiation detection light IDL as detection light in a planar form along the screen SS, as shown in FIG. 3. As the detection light cast from the detection light irradiation unit 410, for example, near-infrared light is used.

The detection light irradiation unit 410 is, for example, a light irradiation device having a detection light source such as a LED and an optical element which diffuses the detection light emitted from the detection light source along the screen surface (the surface of the screen board 920) and thus casts the detection light as the irradiation detection light IDL. The detection light irradiation unit 410 emits light within a range of approximately 180 degrees downward from the top part of the screen SS. This light forms a layer of light along the screen SS. The surface of the screen SS and the layer of light are not in contact with each other but are preferably close to each other. In this embodiment, the distance between the surface of the screen SS and the layer of light is adjusted within a range of approximately 10 mm to 1 mm.

The area irradiated with the irradiation detection light IDL from the detection light irradiation unit 410 is an area corresponding the projection screen PS on the screen SS and is preferably an area including the projection screen PS.

When detecting an operation of the non-light-emitting pointing element 80, the projector 100 detects reflected light of the irradiation detection light IDL cast from the detection light irradiation unit 410 and reflected off the non-light-emitting pointing element 80, from a picked-up image picked up by the first camera 310 or the second camera 320. In this case, an operation of the non-light-emitting pointing element 80 can be detected in an area irradiated with the irradiation detection light IDL and included in the angle of view of the first camera 310 or the second camera 320. In other words, an area included in the angle of view of the first camera 310 or the second camera 320, of the area irradiated with the irradiation detection light IDL from the detection light irradiation unit 410, is a detection area where an operation of the non-light-emitting pointing element 80 can be detected. In this embodiment, the detection area is indicated by DS in FIG. 2. The detection area DS includes the projection screen PS on the screen SS. The projector 100 may also detect the self-light-emitting pointing element 70, using the reflected light of the irradiation detection light IDL cast from the detection light irradiation unit 410.

The first camera 310 and the second camera 320 have at least a first image pickup function of picking up an image by receiving light in a wavelength range including the wavelength of the detection light emitted from the detection light irradiation unit 410. It is preferable that at least one of the first camera 310 and the second camera 320 has a second image pickup function of picking up an image by receiving light including visible light and can switch between these two image pickup functions. For example, it is preferable that each of the first camera 310 and the second camera 320 has a near-infrared filter switching mechanism, not illustrated, that can place a near-infrared filter, which blocks visible light and only passes near-infrared light, in front of a lens or withdraw the near-infrared filter from in front of the lens. The first camera 310 and the second camera 320 are arranged at the same position in the left-right direction (X-direction) and side by side at a predetermined distance from each other in the front-rear direction (Z-direction). The arrangement of the first camera 310 and the second camera 320 is not limited to this embodiment. For example, the first camera 310 and the second camera 320 may be arranged at the same position in the front-rear direction (Z-direction) and side by side at a predetermined distance from each other in the left-right direction (X-direction). The first camera 310 and the second camera 320 may be arranged at different positions from each other in all of the X, Y, and Z-directions. Arranging the first camera 310 and the second camera 320 at different positions from each other in the Z-direction, that is, shifting the positions of the first camera 310 and the second camera 320 from each other in the front-rear direction, is preferable because high accuracy on the Z-coordinate is achieved in calculating a three-dimensional position based on triangulation.

The projector 100 can detect a pointing operation of the self-light-emitting pointing element 70 or the non-light-emitting pointing element 80, specify a pointed position, and carry out an operation corresponding to the pointed position. For example, the projector 100 operates in a whiteboard mode in which the projector 100 draws a line or geometric figure corresponding to an operation of the self-light-emitting pointing element 70 or the non-light-emitting pointing element 80 and projects the drawn line or geometric figure as the projection screen PS. In the whiteboard mode, the projector 100 may project an image including a menu bar for setting an attribute of a geometric figure to be drawn or an operation of the projector 100, as the projection screen PS.

The projector 100 can also operate in other modes than the whiteboard mode. For example, the projector 100 executes an operation mode in which the projector 100 projects the projection screen PS, based on image data inputted from an image source, not illustrated, such as a personal computer.

When the projector 100 detects the pointing element 780, using the irradiation detection light IDL, the detection may be hindered by an obstacle H. If the obstacle H blocking the irradiation detection light IDL is located inside the detection area DS or between the detection area DS and the detection light irradiation unit 410, there is an area which the irradiation detection light IDL does not reach, in the detection area DS. FIG. 2 shows an example where the obstacle H exists inside the detection area DS. In this example, inside the detection area DS, the obstacle H affects the propagation of the irradiation detection light IDL and therefore the irradiation detection light IDL does not reach an area indicated by HA. This area is called a detection-hindered area HA.

Also, in the detection-hindered area HA, when the self-light-emitting pointing element 70 is in use and casts pointing element signal light PSL (FIG. 4), the propagation of the pointing element signal light PSL may be hindered by the obstacle H. That is, in the detection-hindered area HA, the detection of the position of the self-light-emitting pointing element 70 as well as the non-light-emitting pointing element 80 is affected by the obstacle H.

In the example of FIG. 2, the detection-hindered area HA, which the irradiation detection light IDL does not reach, includes an area at a position overlapping the obstacle H and an area located farther than the obstacle H from the detection light irradiation unit 410, which is the light source of the irradiation detection light IDL. If the obstacle H is an object which reflects, refracts, or absorbs the irradiation detection light IDL, the irradiation detection light IDL does not reach the detection-hindered area HA, or the propagation state of the irradiation detection light IDL changes. Therefore, an image pickup unit 300 cannot pick up an image of the reflected light of the irradiation detection light IDL, or the detection accuracy for the position of the pointing element 780 drops. The obstacle H shown in FIG. 2 is simply an example. An object of any shape or size that does not completely transmit the irradiation detection light IDL can be the obstacle H affecting the detection. More specifically, an object located inside the detection area DS or between the detection area DS and the detection light irradiation unit 410, at a position overlapping the irradiation detection light IDL cast in a planar form as shown in FIG. 3, becomes the obstacle H.

The projector 100 executes a function to cope with the hindrance to the position detection in the detection-hindered area HA. Specifically, the projector 100 has a function to detect the obstacle H, a function to display information about the obstacle H and the detection-hindered area HA, a function to carry out a setting not to perform detection in the detection-hindered area HA, and a function to request the user to carry out this setting.

Configuration of Projector

Figure 4:
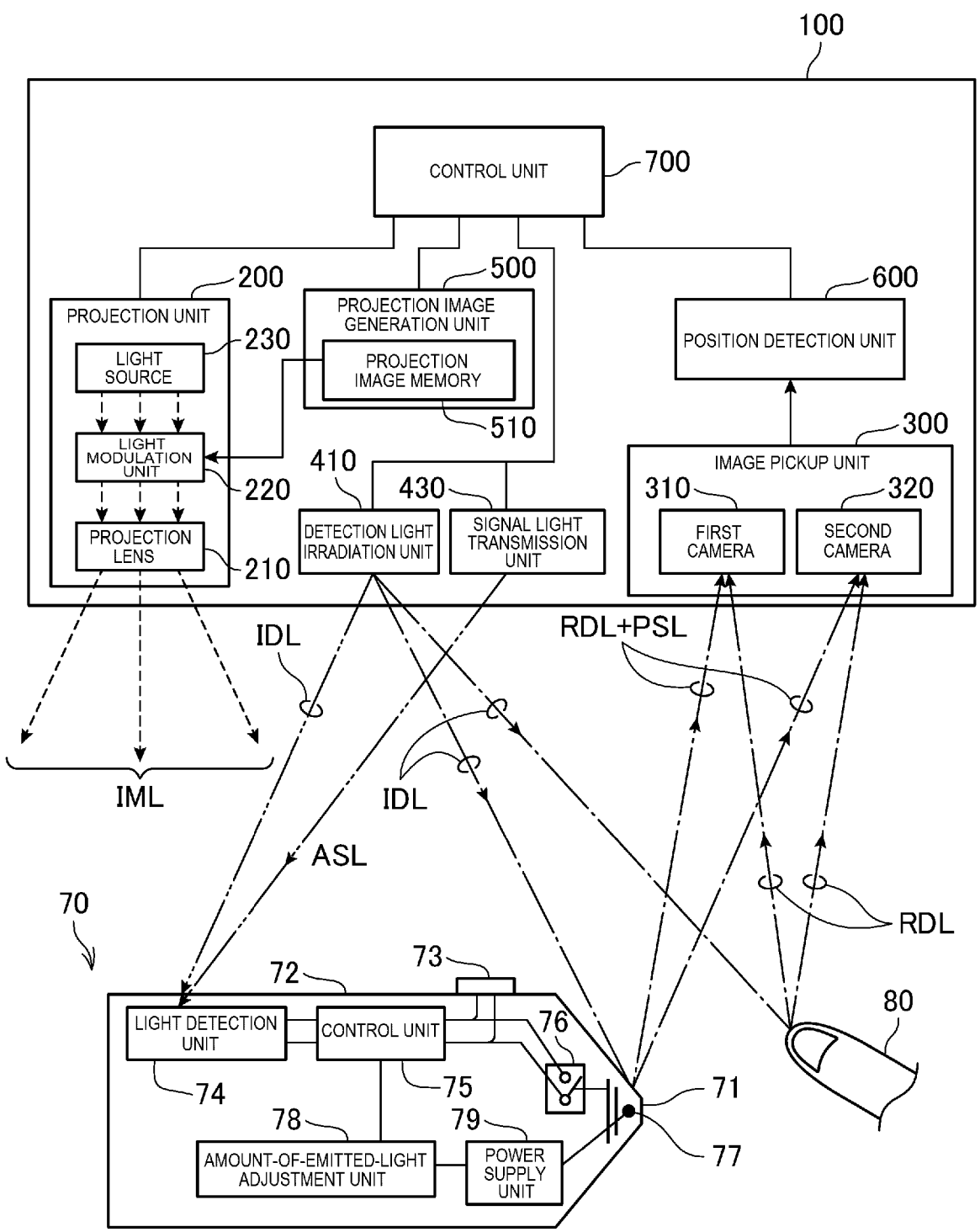
FIG. 4 is a block diagram of a projector and a pointing element forming the projection system.

FIG. 4 is a block diagram showing the internal configuration of the projector 100 and the self-light-emitting pointing element 70. The projector 100 has a control unit 700, a projection unit 200 (display unit), a projection image generation unit 500, a position detection unit 600, an image pickup unit 300, a detection light irradiation unit 410, and a signal light transmission unit 430.

The control unit 700 controls each part within the projector 100. The control unit 700 also carries out detection of the three-dimensional position of the self-light-emitting pointing element 70 and/or the non-light-emitting pointing element 80 detected by the position detection unit 600, and detection of contact with the screen SS. The control unit 700 determines the content of an instruction given by an operation of the self-light-emitting pointing element 70 and/or the non-light-emitting pointing element 80 and controls processing in which the projection image generation unit 500 prepares or changes a projection image, based on the instruction.

The projection image generation unit 500 has a projection image memory 510 which stores a projection image. The projection image memory 510 is a so-called frame memory which stores an image to be projected by the projection unit 200, on a frame basis.

The projection image generation unit 500 draws a projection image to be projected on the screen SS in the projection image memory 510, based on image data. The projection image generation unit 500 outputs an image signal representing the image in the projection image memory 510 to a light modulation unit 220 and causes the projection unit 200 to project the projection screen PS. The projection image generation unit 500 executes image processing on the image drawn in the projection image memory 510. For example, the projection image generation unit 500 executes geometric correction processing to correct a keystone distortion or the like of the projection screen PS, digital zoom processing to enlarge or reduce the projection screen PS, color correction processing to correct the color tone or the like of the projection screen PS, or the like.

The projection unit 200 projects the image processed by the projection image generation unit 500 onto the screen SS. The projection unit 200 has a projection lens 210, alight modulation unit 220, and a light source 230. The light modulation unit 220 modulates light from the light source 230 according to the image signal inputted from the projection image memory 510 and thus forms projection image light IML. The projection image light IML is typically color image light including visible light of the three colors of RGB and is projected onto the screen SS by the projection lens 210. As the light source 230, various light sources can be employed such as a lamp like an ultra-high-pressure mercury lamp, a solid-state light source like a LED (light-emitting diode) or laser diode, or other light sources. As the light modulation unit 220, a transmission-type or reflection-type liquid crystal panel, digital mirror device or the like can be employed. A plurality of light modulation units 220 corresponding to the individual color light components may be provided.

The signal light transmission unit 430 transmits device signal light ASL, which is a near-infrared signal for synchronization. The device signal light ASL is an optical signal which the self-light-emitting pointing element 70 can receive via a light detection unit 74, described later. The signal light transmission unit 430 periodically transmits the device signal light ASL while the projector 100 is started up. The position of the signal light transmission unit 430 may be any position where the signal light transmission unit 430 can cast the device signal light ASL onto an area where the self-light-emitting pointing element 70 is used, on the screen SS. For example, the signal light transmission unit 430 may be installed in the main body of the projector 100, near the first camera 310 or the second camera 320. Also, for example, the signal light transmission unit 430 may be arranged at a position near the detection light irradiation unit 410.

The device signal light ASL is, for example, a control signal which designates to the self-light-emitting pointing element 70 a timing when the pointing element signal light PSL, which is near-infrared light with a predetermined light emission pattern, is transmitted from a distal end light emitting unit 77. The self-light-emitting pointing element 70 transmits the pointing element signal light PSL, for example, synchronously with the timing when the device signal light ASL is received. The first camera 310 and the second camera 320 of the image pickup unit 300 execute image pickup at a predetermined timing synchronized with the device signal light ASL, when detecting the position of the pointing element 780. Therefore, the projector 100 can perform image pickup via the image pickup unit 300 in accordance with the timing when the self-light-emitting pointing element 70 emits the pointing element signal light PSL.

The image pickup unit 300 (light receiving unit) has the first camera 310 and the second camera 320. The first camera 310 and the second camera 320 receive light in a wavelength range including the wavelength of the detection light and thus pick up an image. As shown in FIG. 4, the first camera 310 and the second camera 320 receive the pointing element signal light PSL emitted from the self-light-emitting pointing element 70 and thus pick up an image. The first camera 310 and the second camera 320 also receive reflected detection light RDL (reflected light), which is the reflected light of the irradiation detection light IDL emitted from the detection light irradiation unit 410 and reflected off the self-light-emitting pointing element 70 or the non-light-emitting pointing element 80, and thus pick up an image. Thus, the pointing element signal light PSL and the reflected detection light RDL can be detected from the picked-up image picked up by each of the first camera 310 and the second camera 320.

The position detection unit 600 detects the pointing element signal light PSL and the reflected detection light RDL from the picked-up image picked up by at least one of the first camera 310 and the second camera 320. The position detection unit 600 specifies the position of the image of the detected light in the picked-up image and thus detects the position of the self-light-emitting pointing element 70 and the non-light-emitting pointing element 80.

The first camera 310 and the second camera 320 execute image pickup, for example, both in a first period when the irradiation detection light IDL is cast from the detection light irradiation unit 410 and in a second period when the irradiation detection light IDL is not cast from the detection light irradiation unit 410. The position detection unit 600 compares the images picked up in these two kinds of periods and thus can determine whether each pointing element included in the images is the self-light-emitting pointing element 70 or the non-light-emitting pointing element 80.

It is preferable that at least one of the first camera 310 and the second camera 320 has a function of picking up an image using light including visible light, in addition to the function of picking up an image using light including near-infrared light. In this case, the camera picks up an image of the projection screen PS projected on the screen SS, and the projection image generation unit 500 can execute keystone correction using this image. The method of keystone correction using one or more cameras is already known and therefore not described further in detail here.

The position detection unit 600 analyzes, for example, the picked-up image picked up by the first camera 310 and the picked-up image picked up by the second camera 320 and calculates the three-dimensional position coordinates of the distal end part of the pointing element 780, using triangulation. The position detection unit 600 compares the picked-up images picked up in the first period and the second period and thus determines whether each pointing element 780 included in the images is the self-light-emitting pointing element 70 or the non-light-emitting pointing element 80. The position detection unit 600 also detects contact of the pointing element 780 with the screen SS, based on the calculated three-dimensional position (coordinates) of the distal end part of the pointing element 780 or the light emission pattern of the self-light-emitting pointing element 70.

The self-light-emitting pointing element 70 has a light detection unit 74, a control unit 75, a distal end switch 76, a distal end light emitting unit 77, an amount-of-emitted-light adjustment unit 78, and a power supply unit 79, in addition to the distal end part 71, the shaft part 72, and the button switch 73 described above.

The control unit 75 controls each part of the self-light-emitting pointing element 70 and executes an operation corresponding to the reception of the device signal light ASL and an operation corresponding to the operation of the self-light-emitting pointing element 70.

The light detection unit 74 receives the device signal light ASL transmitted from the signal light transmission unit 430. The light detection unit 74 outputs a control signal indicating the timing when the device signal light ASL is received, and data obtained by decoding the device signal light ASL, or the like, to the control unit 75.

The distal end switch 76 is a switch which turns on when the distal end part 71 of the self-light-emitting pointing element 70 is pressed and which turns off when the distal end part 71 is released. The distal end switch 76 is normally off. When the distal end part 71 comes into contact with the screen SS, the distal end switch 76 turns on due to the contact pressure. The control unit 75 transmits different pointing element signal lights PSL between the state where the distal end switch 76 is on and the state where the distal end switch 76 is off. Specifically, when the distal end switch 76 is off, the control unit 75 causes the distal end light emitting unit 77 to emit light in a specific first light emission pattern indicating that the distal end switch 76 is off, and sends the pointing element signal light PSL having the first light emission pattern. Meanwhile, when the distal end switch 76 is on, the control unit 75 causes the distal end light emitting unit 77 to emit light in a specific second light emission pattern indicating that the distal end switch 76 is on, and sends the pointing element signal light PSL having the second light emission pattern. The first light emission pattern and the second light emission pattern are different from each other. Therefore, the projector 100 can identify whether the distal end switch 76 is on or off, by causing the position detection unit 600 to analyze the picked-up image from the image pickup unit 300.

The button switch 73 has the same function as the distal end switch 76. In the state where the button switch 73 is pressed by the user, the control unit 75 causes the distal end light emitting unit 77 to emit light in the second light emission pattern. In the state where the button switch 73 is not pressed, the control unit 75 causes the distal end light emitting unit 77 to emit light in the first light emission pattern. That is, the control unit 75 causes the distal end light emitting unit 77 to emit light in the second light emission pattern, in the state where at least one of the distal end switch 76 and the button switch 73 is on. The control unit 75 causes the distal end light emitting unit 77 to emit light in the first light emission pattern, in the state where both the distal end switch 76 and the button switch 73 are off. The button switch 73 may be assigned a different function from the distal end switch 76.

The power supply unit 79 has a battery such as a primary battery, secondary battery, or photovoltaic battery, as a power supply, and supplies electric power to each component of the self-light-emitting pointing element 70. The self-light-emitting pointing element 70 may have a power switch which turns on/off the supply of electric power from the power supply unit 79. The power supply unit 79 is controlled by the amount-of-emitted-light adjustment unit 78 and adjusts the current supplied to the distal end light emitting unit 77.

Figure 5:
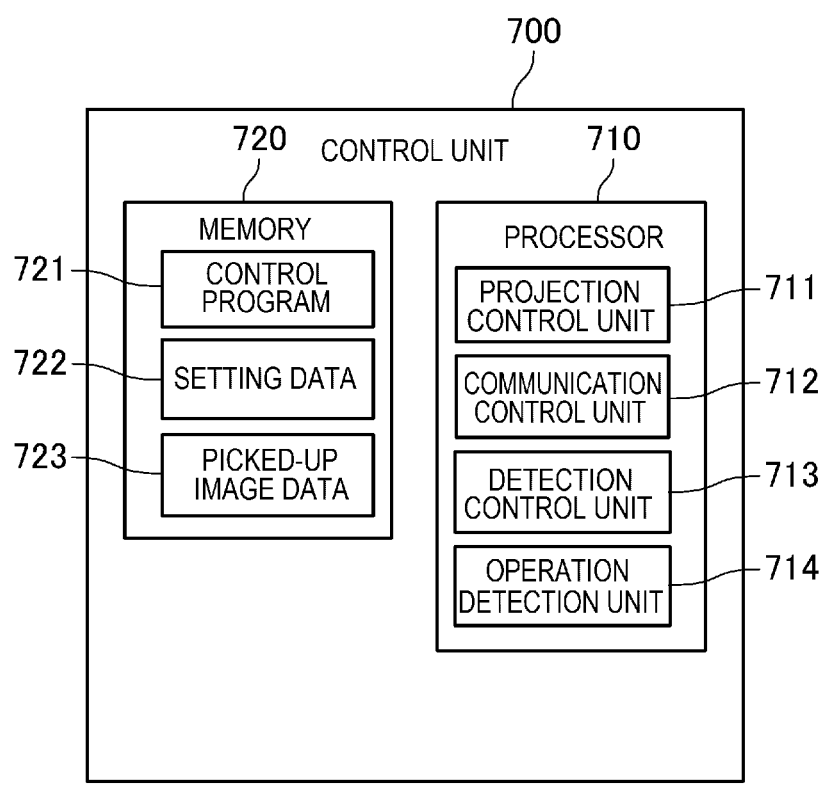
FIG. 5 is a functional block diagram of a control unit of the projector.

FIG. 5 is a functional block diagram of the control unit 700 of the projector 100.

The control unit 700 has a processor 710 and a memory 720. The memory 720 is a storage device which stores a control program executed by the processor 710 and data in a non-volatile manner. The memory 720 is made up of a semiconductor memory element or the like, such as a flash ROM. The memory 720 may include a RAM which forms a work area for the processor 710.

The processor 710 is made up of a CPU (central processing unit), microcomputer, or other arithmetic processing devices. The processor 710 executes a control program 721 stored in the memory 720 and thus functions as a projection control unit 711, a communication control unit 712, a detection control unit 713, and an operation detection unit 714. That is, these functional blocks are implemented by a collaboration of software and hardware as the processor 710 executes the control program 721.

The memory 720 also stores setting data 722 and picked-up image data 723 in addition to the control program 721.

The setting data 722 includes a set value for operations of the projector 100. The set value included in the setting data 722 is, for example, a setting about image processing executed by the projection image generation unit 500, a parameter used by the projection image generation unit 500 for image processing, and the like.

The picked-up image data 723 is picked-up image data outputted from the image pickup unit 300. The image pickup unit 300 outputs picked-up image data to the control unit 700 every time the image pickup unit 300 performs image pickup by at least one of the first camera 310 and the second camera 320. The control unit 700 temporarily stores the picked-up image data in the memory 720 in order to perform processing to analyze the picked-up image data.

The projection control unit 711 controls the projection image generation unit 500 and the projection unit 200 and causes the projection unit 200 to project an image drawn by the projection image generation unit 500, as the projection screen PS.

The communication control unit 712 controls the signal light transmission unit 430 to transmit a control signal to the self-light-emitting pointing element 70. The communication control unit 712 also analyzes the picked-up image data 723 and thus analyzes an infrared signal emitted from the self-light-emitting pointing element 70. For example, the control unit 75 may encode control data to include the timing when the distal end light emitting unit 77 emits light, and then transmit the pointing element signal light PSL. In this case, the communication control unit 712 specifies and decodes the timing when the image of the pointing element signal light PSL appears in the picked-up image data 723, and thus can receive the control data transmitted on the pointing element signal light PSL from the self-light-emitting pointing element 70.

The operation detection unit 714 (operation unit) accepts an operation to the projector 100 by the user. When an image forming a GUI (graphical user interface) is generated by the projection image generation unit 500 and projected by the projection unit 200, the operation detection unit 714 detects an operation of the self-light-emitting pointing element 70 and the non-light-emitting pointing element 80 to the GUI. For example, the operation detection unit 714 detects an operation of the self-light-emitting pointing element 70 and the non-light-emitting pointing element 80 to an image for operation that forms the GUI, such as an icon or button. In this case, the operation detection unit 714 specifies an image for operation that overlaps the operation position, based on an operation position detected by the position detection unit 600 and the content of the projection screen PS generated by the projection image generation unit 500. The operation detection unit 714 executes processing corresponding to the specified icon or button.

The operation detection unit 714 also detects an operation of the distal end part 71 of the self-light-emitting pointing element 70 and an operation of the button switch 73, based on the picked-up image from the image pickup unit 300. The operation detection unit 714 also detects an operation on an operation panel provided on the main body of the projector 100 or an operation of a remote controller for operating the projector 100.

The detection control unit 713 controls the position detection unit 600 to detect the position of the self-light-emitting pointing element 70 and the non-light-emitting pointing element 80. The detection control unit 713 also executes calibration for position detection.

Position Detection by Projector

The processing in which the projector 100 detects the position of the self-light-emitting pointing element 70 and the non-light-emitting pointing element 80 will now be described.

The signal light transmitted and received in the projection system 900 includes the following five:

(1) the projection image light IML, which is image light projected onto the screen SS by the projection lens 210 in order to project the projection screen PS onto the screen SS, and is visible light in order to form an image visible to the user;

(2) the irradiation detection light IDL, which is near-infrared light cast from the detection light irradiation unit 410 in order to detect the self-light-emitting pointing element 70 and the non-light-emitting pointing element 80;

(3) the reflected detection light RDL, which is the reflected light of the irradiation detection light IDL reflected off the self-light-emitting pointing element 70 and the non-light-emitting pointing element 80 and is near-infrared light, similarly to the irradiation detection light IDL;

(4) the device signal light ASL, which is near-infrared light emitted from the signal light transmission unit 430 of the projector 100 in order to synchronize the projector 100 with the self-light-emitting pointing element 70; and (5) the pointing element signal light PSL, which is near-infrared light emitted from the distal end light emitting unit 77 of the self-light-emitting pointing element 70.

In this embodiment, an example where the first camera 310 is used as a camera for position detection is described. In this case, the first camera 310 is equivalent to the image pickup unit. In this example, the detection control unit 713 acquires a picked-up image picked up by the first camera 310, detects an image of the pointing element signal light PSL from the picked-up image, and thus detects the position of the self-light-emitting pointing element 70. The detection control unit 713 also detects an image of the reflected detection light RDL from the picked-up image picked up by the first camera 310 and thus detects the position of the non-light-emitting pointing element 80. The detection control unit 713 may detect the position of the self-light-emitting pointing element 70 by detecting an image of the reflected detection light RDL from the picked-up image picked up by the first camera 310. The projector 100 can also use the second camera 320 as a camera for position detection. The projector 100 may also use both the first camera 310 and the second camera 320 of the image pickup unit 300.

As the calibration processing, the detection control unit 713 generates calibration data which establishes a correspondence between the position of the image of the pointing element signal light PSL in the picked-up image by the first camera 310 and the position of the self-light-emitting pointing element 70 on the screen SS. The detection control unit 713 also generates calibration data which establishes a correspondence between the position of the image of the reflected detection light RDL in the picked-up image by the first camera 310 and the position of the non-light-emitting pointing element 80 on the screen SS. These calibration data are stored as the setting data 722 in the memory 720.

The detection control unit 713 executes a function to cope with a hindrance to the position detection in the detection-hindered area HA. That is, the detection control unit 713 detects the image of the reflected detection light RDL from the picked-up image data from the first camera 310 and thus detects an obstacle H. The detection control unit 713 finds the detection-hindered area HA, based on the position and size of the obstacle H. The detection control unit 713 causes the projection control unit 711 to display information about the obstacle H and the detection-hindered area HA, as the projection screen PS. The detection control unit 713 requests the user to set whether to detect an operation in the detection-hindered area HA or not. The detection control unit 713 also sets whether to detect an operation in the detection-hindered area HA or not, according to the operation by the user. This setting is applied to the processing in which the operation detection unit 714 detects an operation of the self-light-emitting pointing element 70 and the non-light-emitting pointing element 80.

When executing calibration, the detection control unit 713 may carry out triangulation using the picked-up image by the first camera 310 and the picked-up image by the second camera 320 and thus specify the position of the self-light-emitting pointing element 70 or the non-light-emitting pointing element 80.

The detection control unit 713 controls the position detection unit 600 to detect the image of the pointing element signal light PSL from each of the picked-up image picked up by the first camera 310 and the picked-up image picked by the second camera 320. The position of the first camera 310 is offset from the screen SS as described above.

The detection control unit 713 executes arithmetic processing of triangulation, based on the difference in the position of the image of the pointing element signal light PSL between the picked-up images, and thus can specify the position of the self-light-emitting pointing element 70. Similarly, the detection control unit 713 detects the position of the image of the reflected detection light RDL in the picked-up images picked up by the first camera 310 and the second camera 320. The detection control unit 713 executes arithmetic processing of triangulation, based on the difference between the positions of the detected images, and thus can specify the position of the non-light-emitting pointing element 80. In these processes, the position detection unit 600 may execute the arithmetic processing of triangulation under the control of the detection control unit 713. Also, the position detection unit 600 may execute the detection of the position of the image of the pointing element signal light PSL and/or the reflected detection light RDL in the picked-up image data 723, whereas the detection control unit 713 may execute the arithmetic processing of triangulation.

After the position detection based on triangulation is executed in the calibration processing, the position of the self-light-emitting pointing element 70 can be specified, based on the picked-up image by the first camera 310, without performing the processing of triangulation. The same applies to the non-light-emitting pointing element 80. That is, the detection control unit 713 detects the position of the self-light-emitting pointing element 70 and the non-light-emitting pointing element 80 from the picked-up image by the first camera 310, based on the calibration data of the setting data 722.

The detection control unit 713 can execute the processing of detecting the obstacle H at an arbitrary timing. In this embodiment, the case of carrying out processing including the detection of the obstacle H when executing calibration is described as an example.

Operation of Projector

Figure 6:
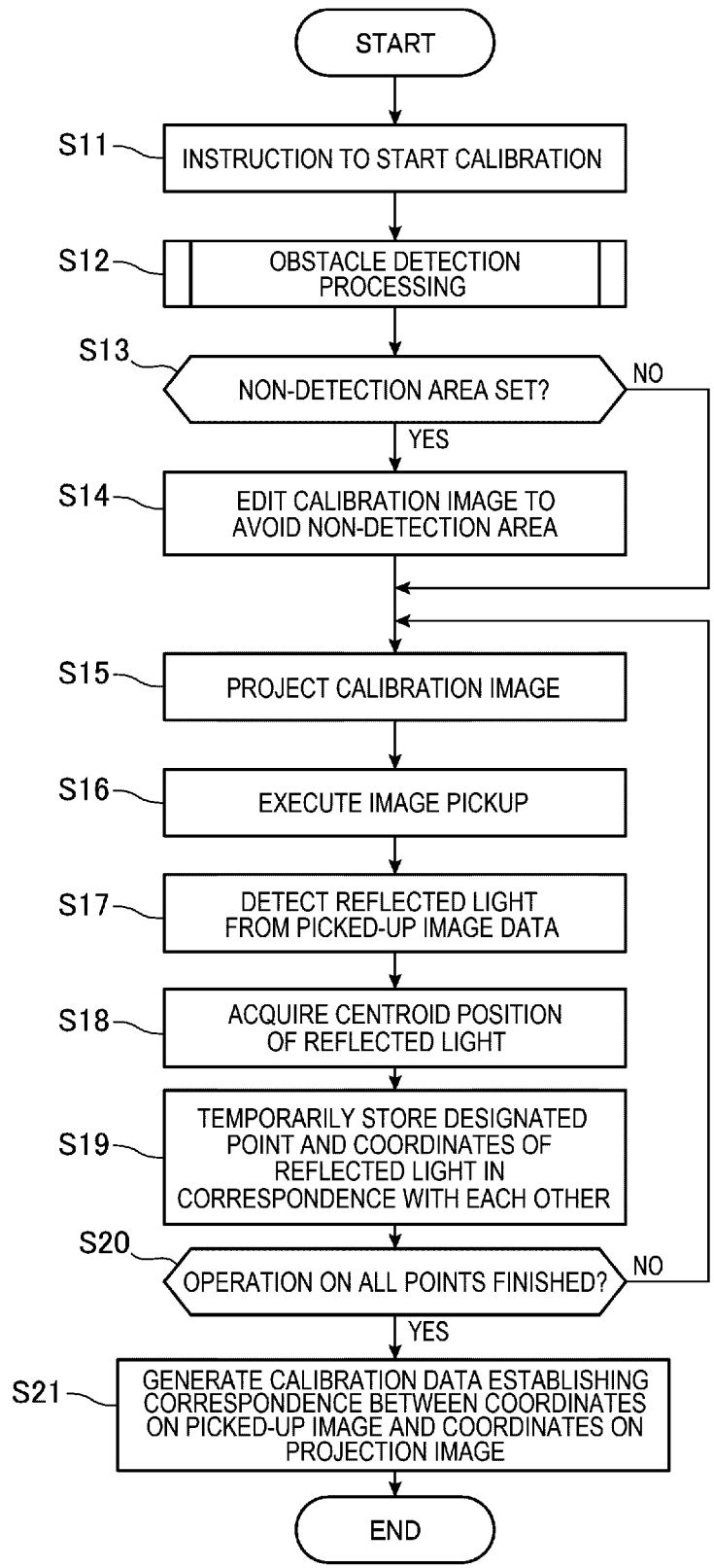
FIG. 6 is a flowchart showing operations of the projector.
Figure 7:
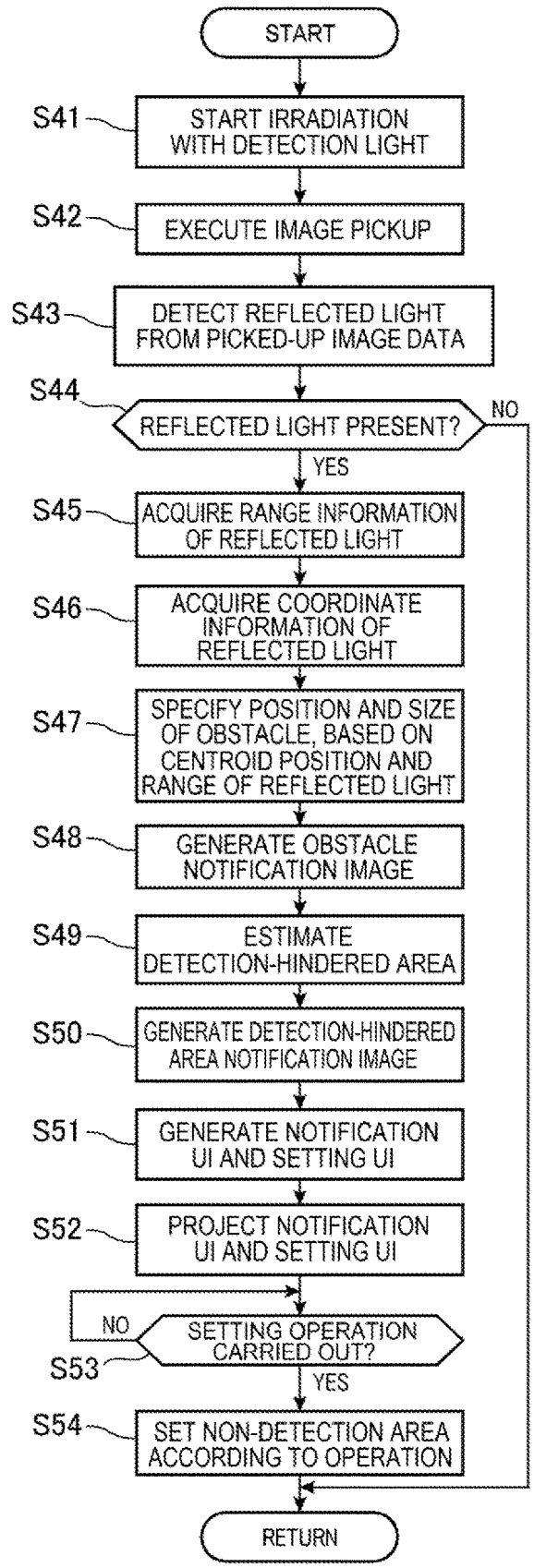
FIG. 7 is a flowchart showing operations of the projector.

FIGS. 6 and 7 are flowcharts showing an operation of the projector 100. FIG. 6 shows an operation involved in calibration. FIG. 7 shows details of obstacle detection processing of step S12 in FIG. 6.

The detection control unit 713 detects an instruction to start calibration (step S11) and then executes obstacle detection processing to detect the obstacle H (step S12). In FIG. 6, the case of carrying out calibration for the detection of the position of the non-light-emitting pointing element 80 is described as an example. However, the same processing may be applied to calibration for the detection of the position of the self-light-emitting pointing element 70.

FIG. 7 shows details of step S12.

To normally execute the operation shown in FIG. 7, it is desirable that the user does not operate the self-light-emitting pointing element 70 or the non-light-emitting pointing element 80 during the operation. Therefore, before the operation in FIG. 7, the detection control unit 713 may cause the projection unit 200 to display a message or the like notifying the user not to bring the self-light-emitting pointing element 70, the non-light-emitting pointing element 80 or any other objects close to the screen SS.

The detection control unit 713 causes the detection light irradiation unit 410 to start irradiation with the irradiation detection light IDL (step S41). The projector 100 executes irradiation with the irradiation detection light IDL during startup. Therefore, if the irradiation detection light IDL is already cast at the start of the operation in FIG. 7, the detection control unit 713 skips step S41.

The detection control unit 713 causes the image pickup unit 300 to execute image pickup and acquires picked-up image data (step S42). In step S42, image pickup may be executed by only one of the first camera 310 and the second camera 320. Also, image pickup may be executed by both the first camera 310 and the second camera 320 so that triangulation can be executed.

The detection control unit 713 detects an image of the reflected detection light RDL from the picked-up image data acquired in step S42 (step S43). The detection control unit 713 determines whether an image of the reflected detection light RDL exists or not (step S44). If there is no image of the reflected detection light RDL (NO in step S44), the detection control unit 713 ends this processing and returns to FIG. 6.

If it is determined that there is an image of the reflected detection light RDL in the picked-up image data (YES in step S44), the detection control unit 713 specifies the range of the image of the reflected detection light RDL in the picked-up image data and acquires range information (step S45). The range information is information that specifies the range of the image of the reflected detection light RDL in the picked-up image data and that specifies the boundary between the image of the reflected detection light RDL and the rest of the picked-up image data. The detection control unit 713 acquires coordinate information representing the coordinates of the image of the reflected detection light RDL, based on the range information acquired in step S45 (step S46). For example, the detection control unit 713 calculates the coordinates of the centroid position of the range represented by the range information and defines the calculated coordinates as coordinate information.

The detection control unit 713 specifies the position of the obstacle H in the detection area DS and the size of the obstacle H, based on the coordinates of the centroid position calculated in step S46 and the range information (step S47). In step S47, the detection control unit 713 converts the position in the picked-up image data into a position in the projection screen PS, for example, based on the calibration data included in the setting data 722, and thus specifies the position of the obstacle H. If image pickup is executed by both the first camera 310 and the second camera 320 in step S42, the detection control unit 713 in step S47 may specify the position of the obstacle H in detail by triangulation.

The detection control unit 713 generates an obstacle notification image which gives information about the obstacle H, corresponding to the position and size of the obstacle H specified in step S47 (step S48).

The detection control unit 713 estimates the detection-hindered area HA, based on the position and size of the obstacle H specified in step S47 and the position of the detection light irradiation unit 410 (step S49). The detection control unit 713 generates a detection-hindered area notification image which gives information about the detection-hindered area HA, corresponding to the detection-hindered area HA estimated in step S49 (step S50).

The detection control unit 713 generates a notification UI (user interface) which provides the user with information about the obstacle H and a setting UI (user interface) which prompts the user to carry out a setting about the detection-hindered area HA (step S51). The notification UI includes the obstacle notification image generated in step S48 and the detection-hindered area notification image generated in step S50. The setting UI is a GUI which requests the user to carry out a setting about whether to detect an operation in the detection-hindered area HA or not. The detection control unit 713 causes the projection unit 200 to project the notification UI and the setting UI generated in step S51 (step S52).

Figure 8:
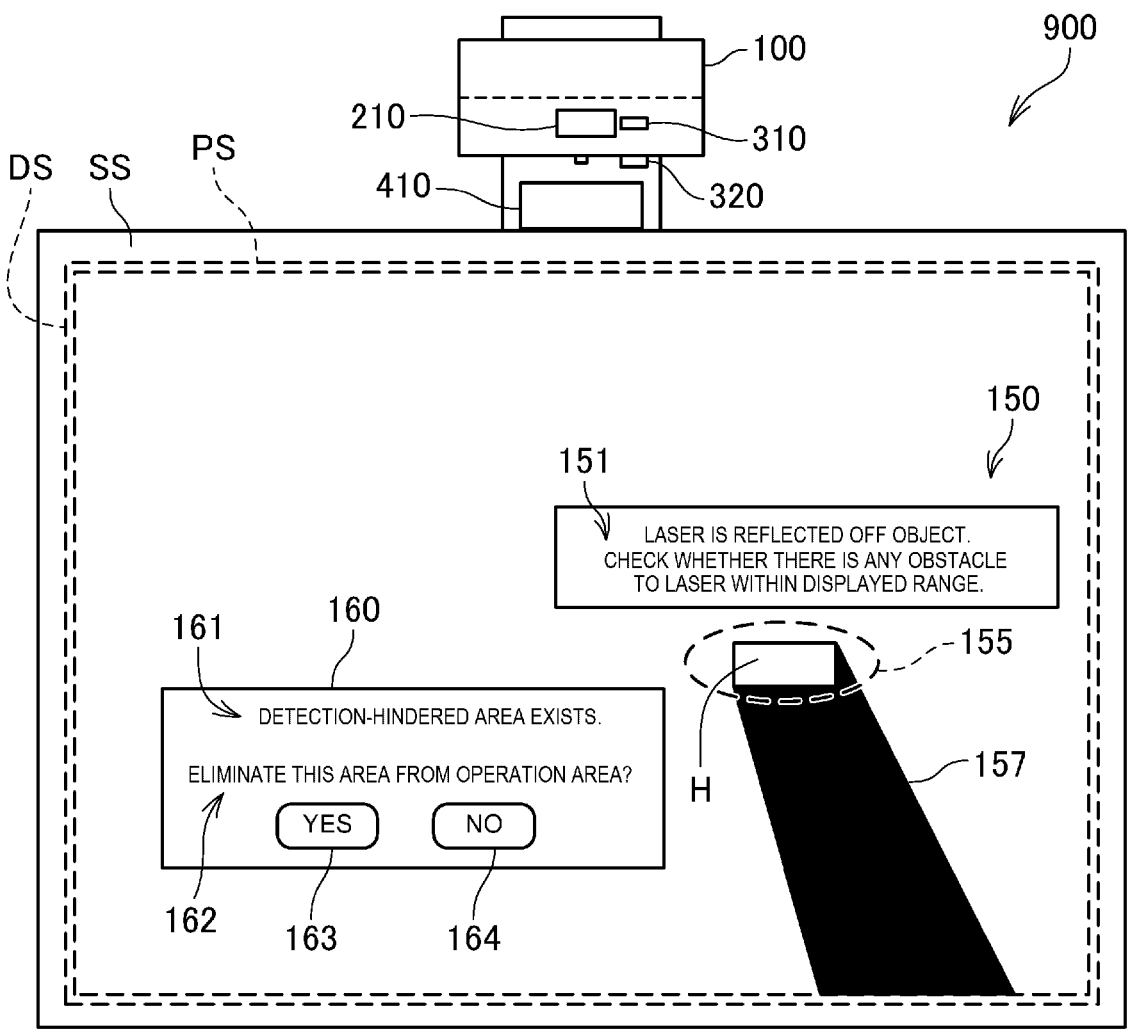
FIG. 8 shows an example of an image projected by the projector.

FIG. 8 shows an example of an image projected by the projector 100.

In the example shown in FIG. 8, a notification UI 150 is projected, corresponding to the position of the obstacle H. The notification UI 150 is an example of the notification UI generated by the detection control unit 713 in step S51. The notification UI 150 includes a notification message 151, an obstacle notification image 155, and a detection-hindered area notification image 157.

The notification message 151 is a message reporting that the obstacle H exists, by text. The position of the notification message 151 is not particularly limited but is preferably a position avoiding the position of the obstacle H and the detection-hindered area HA.

The obstacle notification image 155 is an example of the obstacle notification image generated by the detection control unit 713 in step S48. The obstacle notification image 155 is an image showing the position of the obstacle H so that the user can recognize the position of the obstacle H. Various geometric figures including an arrow can be used. The obstacle notification image 155 may be a geometric figure such as a circle, ellipse or rectangle showing the size of the obstacle H, as illustrated in FIG. 8.

The detection-hindered area notification image 157 is an example of the detection-hindered area notification image generated by the detection control unit 713 in step S50. The detection-hindered area notification image 157 is an image showing the area where detection is hindered by the obstacle H in the detection area DS, in such a way that this area can be visually recognized on the projection screen PS. The detection-hindered area notification image 157 may a colored geometric figure overlapping the detection-hindered area HA, like the example shown in FIG. 8, or may be a geometric figure showing the boundary between the detection-hindered area HA and the rest. The detection-hindered area notification image 157 may not have to be a geometric figure coinciding with the detection-hindered area HA and may be an arrow or the like indicating an approximate position of the detection-hindered area HA.

In the example shown in FIG. 8, a setting UI 160 is projected. The setting UI 160 is an example of the setting UI generated by the detection control unit 713 in step S51. The setting UI 160 includes a notification message 161, a setting request message 162, and setting buttons 163, 164.

The notification message 161 is a notification message reporting that the detection-hindered area HA exists, by text. The setting request message 162 is a message requesting by text that a setting should be carried out about the position detection in the detection-hindered area HA. The setting buttons 163, 164 are buttons for the user to carry out a setting about the position detection in the detection-hindered area HA by operating the self-light-emitting pointing element 70 or the non-light-emitting pointing element 80. In the example of FIG. 8, operating the setting button 163 carries out a setting to eliminate the detection-hindered area HA from the detection area DS. In this case, if an image of the pointing element signal light PSL or the reflected detection light RDL is detected at a position equivalent to the detection-hindered area HA in the picked-up image data by the first camera 310, the operation detection unit 714 does not detect the position of this image.

If the setting to eliminate the detection-hindered area HA from the detection area DS is carried out, the operation detection unit 714 may perform position detection based on the pointing element signal light PSL, in the detection-hindered area HA. That is, the setting by operating the setting UI 160 may be configured to be applied only to the case where the operation detection unit 714 detects an operation of the non-light-emitting pointing element 80 and not applied to the detection of an operation of the self-light-emitting pointing element 70. In this case, the detection-hindered area HA is an area where position detection is not performed, only with respect to the operation of the non-light-emitting pointing element 80. It can also be said that the setting to eliminate the detection-hindered area HA from the detection area DS is applied only to the position detection based on the reflected detection light RDL.

Operating the setting button 164 causes the detection control unit 713 not to eliminate the detection-hindered area HA from the detection area DS. In this case, the detection control unit 713 sets the setting data 722 in such a way as to perform position detection based on the images of the pointing element signal light PSL and the reflected detection light RDL in the entire detection area DS including the detection-hindered area HA, based on the picked-up image data by the first camera 310. In this case, the operation detection unit 714 detects an operation of the self-light-emitting pointing element 70 and the non-light-emitting pointing element 80 in the entire detection area DS, regardless of the position of the obstacle H.

For example, if the user wishes to remove the obstacle H and then use the entire detection area DS, the setting button 164 is operated.

The position where the setting UI 160 is projected on the projection screen PS is not particularly limited. However, preferably, the setting UI 160 is projected at a position not overlapping the obstacle H and the detection-hindered area HA, in order to detect an operation on the setting buttons 163, 164.

Back to FIG. 7, the detection control unit 713 determines whether an operation on the setting UI is carried out or not (step S53). If an operation is not carried out (NO in step S53), the detection control unit 713 waits until an operation is carried out. If an operation on the setting UI is carried out (YES in step S53), that is, if an operation to select the setting button 163 or the setting button 164 is detected, the detection control unit 713 carries out a setting according to the operation (step S54). Since the setting UI 160 is a GUI, the operation detection unit 714 detects the operation on the setting buttons 163, 164. In response to the detection of the operation on the setting buttons 163, 164 by the operation detection unit 714, the detection control unit 713 executes the processing of steps S53 to S54.

In step S54, the detection control unit 713 sets whether to define the detection-hindered area HA as a non-detection area where an operation is not detected, or not. The non-detection area is an area where position detection is not performed for an image of the pointing element signal light PSL or the reflected detection light RDL in the picked-up image data by the first camera 310 when the detection control unit 713 detects this image, as described above. In step S54, the detection control unit 713 sets information about the non-detection area into the setting data 722. After the processing of step S54, the detection control unit 713 returns to FIG. 6. The non-detection area may be an area including the detection-hindered area HA and the position overlapping the obstacle H, or may be an area made up of the detection-hindered area HA. Since the user is unlikely to carryout an operation at the position overlapping the obstacle H, there is no practical concern even if only the detection-hindered area HA is defined as the non-detection area.

After the obstacle detection processing of step S12, the detection control unit 713 determines whether a non-detection area is set in the detection area DS or not, referring to the setting data 722 (step S13). If a non-detection area is set (YES in step S13), the detection control unit 713 edits a calibration image in such a way as to avoid the non-detection area (step S14) and shifts to step S15.

The calibration image is an image for establishing a correspondence between the position pointed by the non-light-emitting pointing element 80 in the detection area DS and the position in the picked-up image data by the first camera 310. Normally, the calibration image is an image corresponding to the position detection over the entirety of the detection area DS. In step S14, the detection control unit 713 carries out, for example, processing to delete an image corresponding to the non-detection area from the calibration image so that calibration is not performed in the non-detection area.

If a non-detection area is not set (NO in step S13), the detection control unit 713 shifts to step S15.

Figure 9:
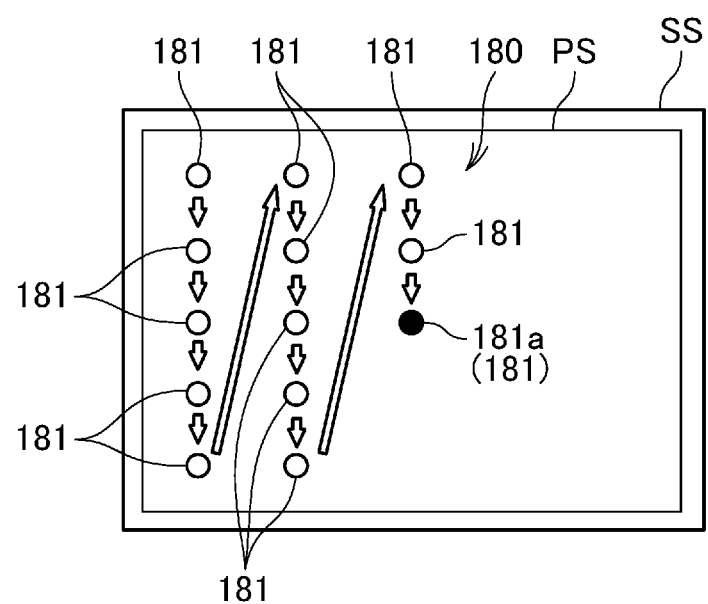
FIG. 9 shows an example of a calibration image projected by the projector.

FIG. 9 shows a calibration image 180 as an example of the calibration image projected by the projector 100.

The calibration image 180 includes a point image 181 which prompts the user to carry out an operation to point a specified position in the detection area DS with the non-light-emitting pointing element 80. A plurality of point images 181 are arranged at equal intervals in the detection area DS. The plurality of point images 181 included in the calibration image 180 are projected one by one in order as the projection screen PS. Every time a point image 181 is projected, the user carries out an operation to point the position of the newly projected point image 181 with the non-light-emitting pointing element 80. The calibration image 180 may be an image in which a newly projected point image 181a is of a different color from the other point images 181, as shown in FIG. 8. That is, it can also be said that the calibration image 180 is a set of a plurality of images including point images 181 of different colors.

The detection control unit 713 detects the non-light-emitting pointing element 80 from the picked-up image data from the image pickup unit 300, every time a point image 181 in the calibration image 180 is projected. Thus, a correspondence between a position on the projection image projected by the projection unit 200 and a pointed position in the picked-up image data can be established at a plurality of positions in the detection area DS.

The detection control unit 713, in step S14, deletes or masks a point image 181 located at a position overlapping the non-detection area, from the calibration image 180. Thus, since no point image 181 is projected in the non-detection area, calibration can be executed in the detection area DS excluding the non-detection area.

Back to FIG. 6, in step S15, the detection control unit 713 causes the projection unit 200 to project a point image in the calibration image (step S15) and causes the image pickup unit 300 to execute image pickup (step S16).

The detection control unit 713 detects an image of the reflected detection light RDL from the picked-up image data from the image pickup unit 300 (step S17) and acquires the centroid position of the detected image (step S18). The detection control unit 713 causes the memory 720 to temporarily store the acquired position of the image and the point image projected in step S15, in correspondence with each other (step S19). The detection control unit 713 determines whether an operation is carried out on all the point images in the calibration image or not (step S20). If the calibration image is edited in step S14, the detection control unit 713 in step S20 determines whether an operation is carried out on all the point images included in the edited calibration image or not.

If there is a point image on which an operation is not carried out yet (NO in step S20), the detection control unit 713 returns to step S15 and causes the next point image to be projected.

If an operation is carried out on all the point images (YES in step S20), the detection control unit 713 generates calibration data, based on the information temporarily stored in step S19 (step S21) and ends this processing. The calibration data is data which establishes a correspondence between a position in the picked-up image data and a position on the projection screen PS, as described above.

As described above, the projector 100 in this embodiment has the projection unit 200, which displays the projection screen PS, and the detection light irradiation unit 410, which radiates the irradiation detection light IDL into the detection area DS, which is set corresponding to the display area where the projection unit 200 displays an image. The projector 100 also has the image pickup unit 300, which receives the reflected detection light RDL of the irradiation detection light IDL reflected in the detection area DS. The projector 100 also has the control unit 700, which carries out the detection of an operation of the non-light-emitting pointing element 80 in the detection area DS and the detection of the obstacle H blocking the irradiation detection light IDL, based on the light reception state of the image pickup unit 300, and causes the projection unit 200 to display information about the obstacle H. The user can readily know the information about the obstacle H and can effectively use the projector 100 by taking an appropriate measure to cope with the obstacle H.

The projector 100, to which the display device and the method for controlling the display device according to the invention are applied, displays information about the obstacle H and thus can provide the user performing an operation with the information about the obstacle H blocking the detection of the operation.

The control unit 700 causes the projection unit 200 to display the position of the obstacle H in the display area of the projection screen PS, that is, on the screen SS. For example, the detection control unit 713 causes the projection unit 200 to display the obstacle notification image 155 notifying the user of the position of the obstacle H on the screen SS. This can provide the user with the information about the position of the obstacle H.

The control unit 700 also specifies the detection-hindered area HA, where the obstacle H hinders irradiation with the irradiation detection light IDL in the detection area DS, and causes the projection unit 200 to display the detection-hindered area HA. For example, the detection control unit 713 causes the projection unit 200 to display the detection-hindered area notification image 157 notifying the user of the position and size of the detection-hindered area HA on the screen SS. This can provide the user with the information about the area where the detection of an operation is hindered.

The control unit 700 causes the projection unit 200 to display the detection-hindered area notification image 157, which is an image showing the detection-hindered area HA, and the obstacle notification image 155, which is an image showing the position of the obstacle H on the detection area DS. This can provide the user with the information about the position of the obstacle H and the area where the detection of an operation is hindered.

The control unit 700 causes the projection unit 200 to display the setting UI 160 equivalent to a setting request which requests a setting about whether to disable the detection of an operation of the non-light-emitting pointing element 80 in the detection-hindered area HA or not. This can prompt the user to set whether to disable the detection of an operation or not.

The projector 100 also has the operation detection unit 714, which accepts an operation. The control unit 700 sets processing to detect an operation in the detection area DS, according to the operation on the setting UI 160 accepted by the operation detection unit 714. Thus, the user can readily carry out a setting about the detection of an operation.

The projector 100 also has the image pickup unit 300, which picks up an image over a range including the detection area DS. The control unit 700 detects an image of the reflected detection light RDL from the picked-up image from the image pickup unit 300, and thus carries out the detection of an operation of the non-light-emitting pointing element 80 in the detection area DS and the detection of the obstacle H blocking the irradiation detection light IDL. This can provide the user with the information about the obstacle H, in the configuration where the reflected detection light RDL is detected from the picked-up image so as to detect an operation by the user.

The control unit 700 also estimates the position and size of the obstacle H, based on the centroid of the image of the reflected detection light RDL detected from the picked-up image from the image pickup unit 300 and the size of the image of the reflected detection light RDL. The control unit 700 causes the projection unit 200 to display the obstacle notification image 155, which is an image based on the position and size of the obstacle H. This can provide the user with the information about the position and size of the obstacle H, based on the image of the reflected detection light RDL in the picked-up image.

Other Embodiments

The embodiment is simply a specific example to which the invention is applied. The invention is not limited to this embodiment.

While an example where the obstacle detection processing of FIG. 7 is executed with calibration is described in the embodiment, the invention is not limited to this example. For example, the projector 100 may execute the operation shown in FIG. 7 when the start of the obstacle detection processing is designated by an operation using the self-light-emitting pointing element 70 or the non-light-emitting pointing element 80, or by an operation on an operation panel (not illustrated) or a remote controller (not illustrated). Also, after the power of the projector 100 is turned on, the projector 100 may execute the obstacle detection processing of FIG. 7 before detecting an operation of the self-light-emitting pointing element 70 or the non-light-emitting pointing element 80.

In the projector 100, the image pickup unit 300 may have one camera or may have three or more cameras. If the image pickup unit 300 has one camera, the two-dimensional coordinates (X, Y) of the self-light-emitting pointing element 70 are decided, based on one image picked up by the camera. To detect the position of the non-light-emitting pointing element 80, a configuration to form light in the form of a layer along the screen SS may be provided.

While the projector 100 configured to be able to use both the self-light-emitting pointing element 70 and the non-light-emitting pointing element 80 is described as an example in the embodiment, the projector may be able to use at least the non-light-emitting pointing element 80.

In the embodiment, it is assumed that all of the irradiation detection light IDL, the reflected detection light RDL, the device signal light ASL, and the pointing element signal light PSL shown in FIG. 2 are near-infrared light. However, a part or all of these lights may be other than near-infrared light.

The display device according to the invention is not limited to the projector 100. A liquid crystal monitor or liquid crystal television which displays an image on a liquid crystal display panel may be employed as the display device. A display device having a plasma display panel, an OLED (organic light-emitting diode), or an organic EL display panel such as an OEL (organic electroluminescence) display may be employed.

Each functional unit shown in FIG. 5 represents a functional configuration and is not limited to any specific form of installation. That is, individual pieces of hardware corresponding to the respective functional unit need not necessarily be installed. A single processor can implement functions of a plurality of functional units by executing a program. A part of the functions implemented by software in the embodiment may be implemented by hardware, and a part of the functions implemented by hardware may be implemented by software. Also, specific details of each of the other parts forming the projection system 900 can be arbitrarily changed without departing from the spirit of the invention.

The entire disclosure of Japanese Patent Application No. 2018-059463, filed Mar. 27, 2018 is expressly incorporated by reference herein.

What is claimed is:

1. A display device comprising:
   a display unit which displays an image;
   a light radiation unit which radiates detection light onto a detection area which is set corresponding to a display area where the display unit displays the image;
   a light receiving unit which receives reflected light of the detection light reflected in the detection area; and
   a control unit which carries out detection of an operation of a pointing element in the detection area and detection of an obstacle blocking the detection light and hindering the detection of the operation of the pointing element, based on a light reception state of the light receiving unit, and causes the display unit to display information about the obstacle, the obstacle being a separate element from the pointing element.

2. The display device according to claim 1, wherein the control unit causes the display unit to display a position of the obstacle in the display area.

3. The display device according to claim 1, wherein the control unit specifies a detection-hindered area where irradiation with the detection light is hindered by the obstacle in the detection area, and causes the display unit to display the detection-hindered area.

4. The display device according to claim 3, wherein the control unit causes the display unit to display an image showing the detection-hindered area and an image showing a position of the obstacle in the detection area.

5. The display device according to claim 3, wherein the control unit causes the display unit to display a setting request which requests a setting about whether to disable detection of an operation of the pointing element in the detection-hindered area or not.

6. The display device according to claim 5, further comprising an operation unit which accepts an operation, wherein the control unit sets processing to detect an operation in the detection area according to an operation accepted by the operation unit in response to the display of the setting request.

7. The display device according to claim 1, wherein
the light receiving unit is an image pickup unit which picks up an image over a range including the detection area, and
the control unit detects an image of the reflected light from a picked-up image picked up by the image pickup unit to carry out detection of an operation of the pointing element in the detection area and detection of an obstacle blocking the detection light.

8. The display device according to claim 7, wherein
the control unit estimates a position and size of the obstacle, based on a centroid of the image of the reflected light detected from the picked-up image picked up by the image pickup unit and a size of the image of the reflected light, and causes the display unit to display an image based on the estimated position and size of the obstacle.

9. A method for controlling a display device comprising:
radiating detection light onto a detection area which is set corresponding to a display area where an image is displayed;
receiving reflected light of the detection light reflected in the detection area;
carrying out detection of an operation of a pointing element in the detection area and detection of an obstacle blocking the detection light and hindering the detection of the operation of the pointing element, based on a light reception state of the reflected light, the obstacle being a spate element from the pointing element; and
displaying information about the obstacle.

10. The method for controlling the display device according to claim 9, wherein
a position of the obstacle in the display area is displayed.

11. The method for controlling the display device according to claim 9, wherein
a detection-hindered area where irradiation with the detection light is hindered by the obstacle in the detection area is specified, and the detection-hindered area is displayed.

12. The method for controlling the display device according to claim 11, wherein
an image showing the detection-hindered area and an image showing a position of the obstacle in the detection area are displayed.

13. The method for controlling the display device according to claim 11, wherein
a setting request which requests a setting about whether to disable detection of an operation of the pointing element in the detection-hindered area or not is displayed.

14. The method for controlling the display device according to claim 13, wherein
processing to detect an operation in the detection area is set according to an operation accepted in response to the display of the setting request.

15. The method for controlling the display device according to claim 9, wherein
an image over a range including the detection area is picked up, and
an image of the reflected light from a picked-up image is detected and detection of an operation of the pointing element in the detection area and detection of an obstacle blocking the detection light are carried out.

16. The method for controlling the display device according to claim 15, wherein
a position and size of the obstacle is estimated, based on a centroid of the image of the reflected light detected from the picked-up image and a size of the image of the reflected light, and an image based on the estimated position and size of the obstacle is displayed.

* * * * *